United States Patent
Overy et al.

(10) Patent No.: US 6,363,264 B1
(45) Date of Patent: *Mar. 26, 2002

(54) RADIO TELEPHONE

(75) Inventors: Michael Overy, Alton (GB); Jaakko Samuli Vanttila, Solana Beach, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/657,643

(22) Filed: Sep. 7, 2000

Related U.S. Application Data (63) Continuation-in-part of application No. 08/803,417, filed on Feb. 20, 1997, now Pat. No. 6,122,530.

(30) Foreign Application Priority Data

Feb. 23, 1996 (GB) .............................................. 9603926

(51) Int. Cl.⁷ ................................................ H04M 3/44
(52) U.S. Cl. ...................... 455/566; 455/90; 455/564; 379/355.01
(58) Field of Search ................................. 455/564, 566, 455/575, 90, 38.4, 67.7, 158.4, 158.5, 412, 418, 462; 379/355, 356, 354; 340/825.44, 825.22, 825.15, 825.27; 345/173, 168, 169

(56) References Cited

U.S. PATENT DOCUMENTS

| 5,016,002 A | 5/1991 | Levanto ..................... 340/756 |
| 6,122,530 A | * 9/2000 | Overy et al. ................ 455/566 |

* cited by examiner

Primary Examiner—Lee Nguyen
(74) Attorney, Agent, or Firm—Perman & Green, LLP (57) ABSTRACT

A radio telephone that returns to a selectable default mode when idle has programmable keys with associated functions that depend upon the default mode of the radio telephone.

6 Claims, 13 Drawing Sheets

RADIO TELEPHONE

This application is a continuation-in-part of application Ser. No. 08/803,417 filed on Feb. 20, 1997 now U.S. Pat. No. 6,122,530.

BACKGROUND OF THE INVENTION

The invention relates to radio telephones, in particular to radio telephones having user input means including a key with an associated legend for indicating the prevailing associated function thereof, and a processor responsive to actuation of the key to perform the respective associated functions.

Radio telephones have become complex technological devices, that can be off putting to users who are wary of technological advances. One of the concerns of designers of radio telephones is how to simplify the phone to comply with the needs of a basic user. The basic user wants to use to use the radio telephone in the same way as he or she would use a typical land line phone i.e. to make and receive calls wilt minimum effort. This needs to be accomplished without alienating the more advanced user who enjoys the abundant features available on many of today's radio telephones.

Telephones are already known which include a speed dialling function allowing the user to call a telephone number stored at a predetermined location in a special abbreviated dialling memory, using a minimum number of keystrokes. This enables simplified operation of the radio telephone which, for private users, who as a result of high tariffs, will typically use the phone to call relatively few numbers under a relatively restricted set of circumstances, can be useful.

Other commercially available radio telephones have a number of dedicated keys for so-called super-speed dialling. These dedicated keys can be programmed by the user for storing selected numbers which can then be dialled using only a single keystroke. In other words, pressing one of the dedicated super-speed dialling keys will initiate a call to the pre-programmed telephone number associated therewith.

Although super-speed dialling has the advantage that only a single key stroke is required to initiate a call, it has the disadvantage that special additional keys are required on the telephone keypad. This tends to make the keypad look more complicated and less user-friendly. Also the use of dedicated keys requires a larger keypad area, which is not compatible with smaller, more compact telephone handsets.

SUMMARY OF THE INVENTION

In accordance with the present invention there is provided a radio telephone operable in respective user selectable default modes to which the radio telephone returns under predetermined conditions comprising a processor, and user input means having a key with an associated legend for indicating the prevailing function associated therewith, the processor being operable to respond to actuation of the key to perform the respective associated function in the respective default modes.

The invention has the advantage of allowing different users to have a default mode tailored to their needs. The default modes may allow respectively simplified and complex use.

The user is preferably able to select the function associated with the programmable key in a default mode. This allows any feature that might otherwise be difficult to perform because a large number of keystrokes are required to reach the function in a menu environment to be performed with a single key stroke. As the function is selectable by the user, the user can customise the telephone to cater for his or her individual needs and priorities. For example, if the user frequently wishes to change the default mode of operation of the handset, the user could select entry to the change of default mode menu setting on actuation of the programmable key.

Providing a programmable key for which the user can select a particular function in a particular default mode allows the user to set the telephone to a mode in which the particular function is performed by actuating the programmable key. A function given a high priority to an individual user is accessible without necessitating a large number of key presses or providing an additional button that adds to the size, weight, cost, cluttered appearance and intimidation produced by the user interface; all of which radio telephone designers are striving to avoid.

The default mode is the mode that the handset enters on exit from other modes of operation of the telephone. The default mode will suitably be entered on powering up the telephone, and on termination of a telephone call.

In one particular embodiment of the invention the user selectable function associated with programmable key in the at least one of the respective default mode is an instant dial feature. The user can select a telephone number, suitably the most commonly used number, to be associated with the programmable key. In this embodiment, when the relevant default mode is selected, by pressing the programmable key the associated telephone number is dialled immediately. This allows the telephone to be set up so that calls to frequently used numbers can be made without using any of the more complicated features typically available on radio telephones. The same telephone can accordingly be used in the most appropriate fashion by both a basic and an advanced user.

In order to allow a simplified mode of operation of the telephone to be overridden in a straightforward fashion, suitably the processor is operable to change the function associated with the programmable key when in that default mode by user generation of a predefined cancellation signal. The function associated with the programmable key may only temporarily be changed in response to the cancellation signal. Under these circumstances, it is possible for the function associated with the programmable key to revert to the function defined in another default mode following generation of the cancellation signal.

The radio telephone suitably comprises a display to which the programmable key is adjacent and on which the associated legend is displayed.

The user input means may comprise a plurality of programmable keys each having a respective function associated therewith for each of the default modes.

The invention will be described in more detail, by way of example, with reference to the accompanying drawings of which:

DETAILED DESCRIPTION OF THE INVENTION

Figure 1:
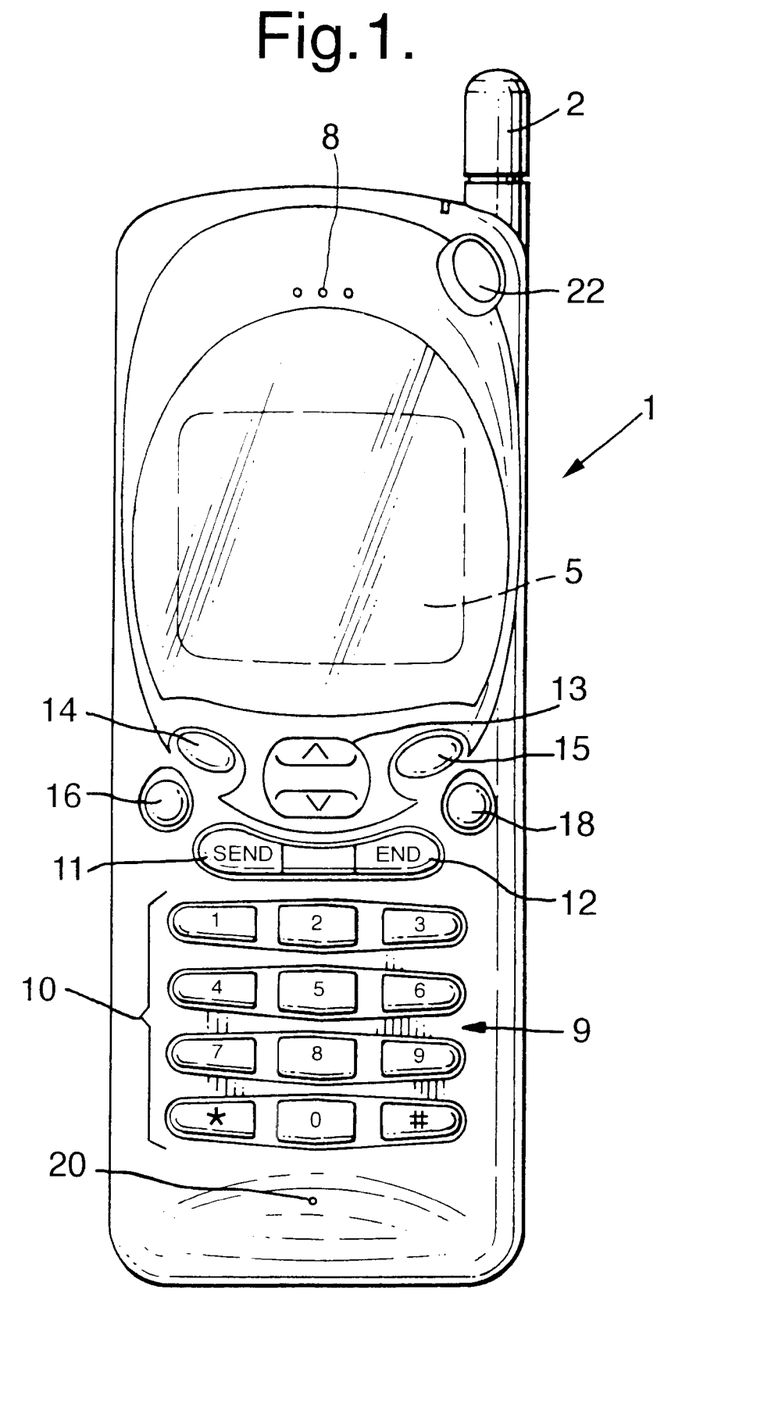
FIG. 1 is a front view of a radio handset in accordance with an embodiment of the present invention.
Figure 2:
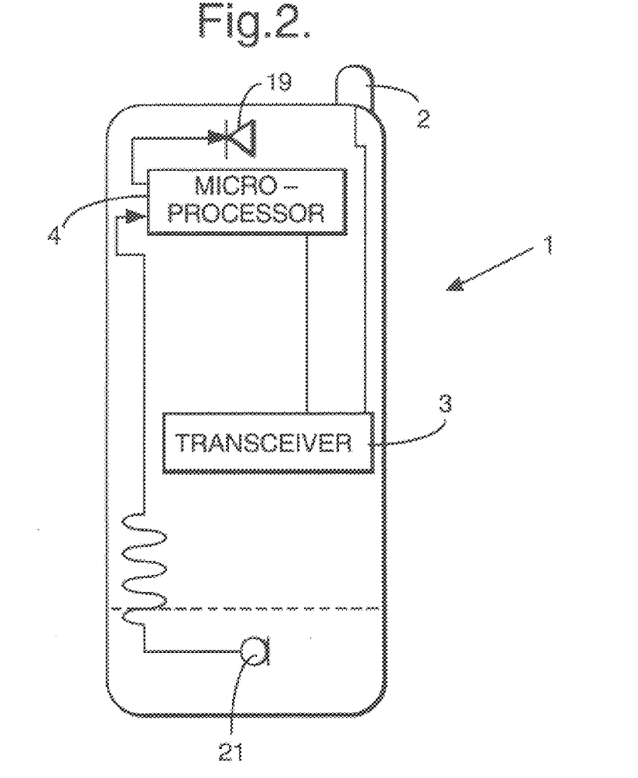
FIG. 2 is a schematic representation of the radio handset of FIG. 1.

A radio telephone in accordance with an embodiment of this invention shown in FIGS. 1 and 2 comprises a housing 1 enclosing substantially the whole of the electronic circuitry of the radio telephone. The radio telephone has an antenna 2, a transceiver 3 and processing means 4 programmed with an algorithm which is operative to select a communication channel with a base station (FIG. 2). Information is displayed on a Liquid Crystal Display 5 (LCD).

Included on the housing is a key pad 9 which comprises a first group of keys or buttons 10 labelled 0–9, * and # arranged in an array of three columns and four rows, as is usual. The numeric digits 0,1, . . . 9 and the characters "*" and "#" are for dialling telephone numbers, but can also be used for entering alphanumeric data into the telephone number store. A second group of control keys or buttons for selecting various functions such as a call start key (e.g. labelled SEND) 11 a call terminate key 12 (e.g. labelled END), a scroll key 13, first 14 and second 15 soft keys that have a different associated function dependent upon the operating state of the radio telephone, a clear key 16, and a alphanumeric key 17 that toggles the input from the first group of keys between digits and alpha keys. For the purposes of this specification the term 'key' is taken to mean key or button or any similar element for providing input to the microprocessor 4, preferably input from a user. The display panel, LCD 5 is located on the housing 1 above the two groups of keys. Above the display 5 is located a series of holes 8 behind which is an earphone 19 or speaker for transmitting speech or other sounds to the user of the radio telephone. The housing 1 also has a hole 20 at its lower end behind which is mounted a microphone 21 (FIG. 2). The power is controlled by power key 22.

Figure 3:
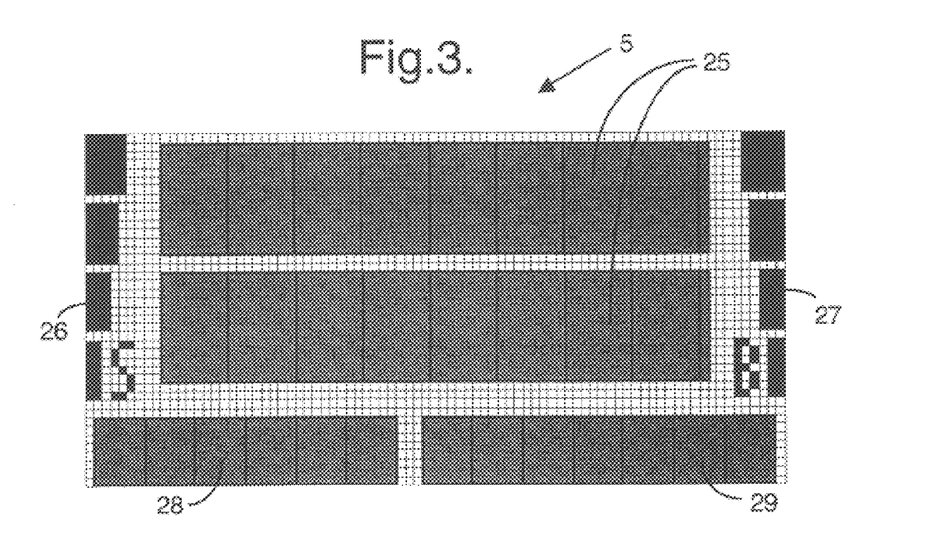
FIG. 3 is a schematic representation of the liquid crystal display of the radio handset of FIGS. 1 and 2.

The user interface of the handset is shown in more detail in FIG. 3. The visual display comprises the liquid crystal display 5 having regions 25 for displaying text to the user, a signal strength side bar 26 indicating signal strength and a battery capacity side bar 27 indicating battery capacity and first and second regions 28, 29 situated adjacent the soft keys 14,15 for displaying a legend indicating the prevailing function of the associated soft key.

In a NORMAL mode of operation, the soft keys 14, 15 may be used to access a variety of pre-set menus. In this mode one of the keys will have the legend 'MENU' displayed above it in the first region 28 on the LCD 5. The legend MEMORY is displayed in the region 29. Depression of this key will allow telephone numbers stored in the memory to be recalled by name or number. Depression or actuation of this soft key 16 with the legend MENU enables the variety of pre-set menus, the related instructions of which are stored in memory, to be viewed by depressing the scroll key 13 an appropriate number of times in one direction until a desired menu is reached. When the user is scrolling through the list of menus, the legend above the left hand soft key 44 changes to 'select'. Actuation of the soft key 14 with this legend then allows the displayed menu to be selectively enabled. Once the relevant sub-menu is selected, the user is, prompted to use the scroll key 13 to view each menu item in turn. The legends for the left and right hand soft keys 14,15 are then 'Select' and 'Quit' respectively to allow the user either to select a particular menu item or return to the previous screen as required. This is one way in which the soft keys can be utilised in a NORMAL mode of operation.

The radio telephone of this embodiment of the invention has an 'idle' state. This is the state adopted by the radio telephone when powered up and to which it reverts when not in use either because a call is terminated or other operations have been completed.

The functions of the soft keys in the idle state are dictated by the mode of operation adopted in the idle state, the default mode. For example, in a second mode of operation, termed the EASY OPERATION mode, the soft keys are arranged to function as speed-dial keys. The legend associated with the soft keys in this mods will indicate telephone numbers the user may wish to dial, for example, 'Peter' and 'Jack' respectively. Depressing or actuating one of the soft keys results in the telephone number associated with that soft key being dialled. The user need do no more than press the key and the call is made. There is no need even to press the SEND key following dialling the telephone number as is ordinarily the case.

Operation of the handset will now be described with reference to the two modes of operation possible in the idle state for this embodiment of the invention. These are the NORMAL mode in which the two soft keys perform the functions respectively of selecting the menu and accessing the radio telephone's memories when idle and an EASY OPERATION mode in which in the idle state the two soft keys perform the functions of speed dialling respective numbers selected by the user. In the EASY OPERATION mode, the legends above the soft keys are programmable by the user to label the numbers to be dialled when the keys are depressed so that the user is prompted to recall which numbers are associated with the soft keys. The soft keys themselves are programmable with the numbers to be dialled.

Figure 7:
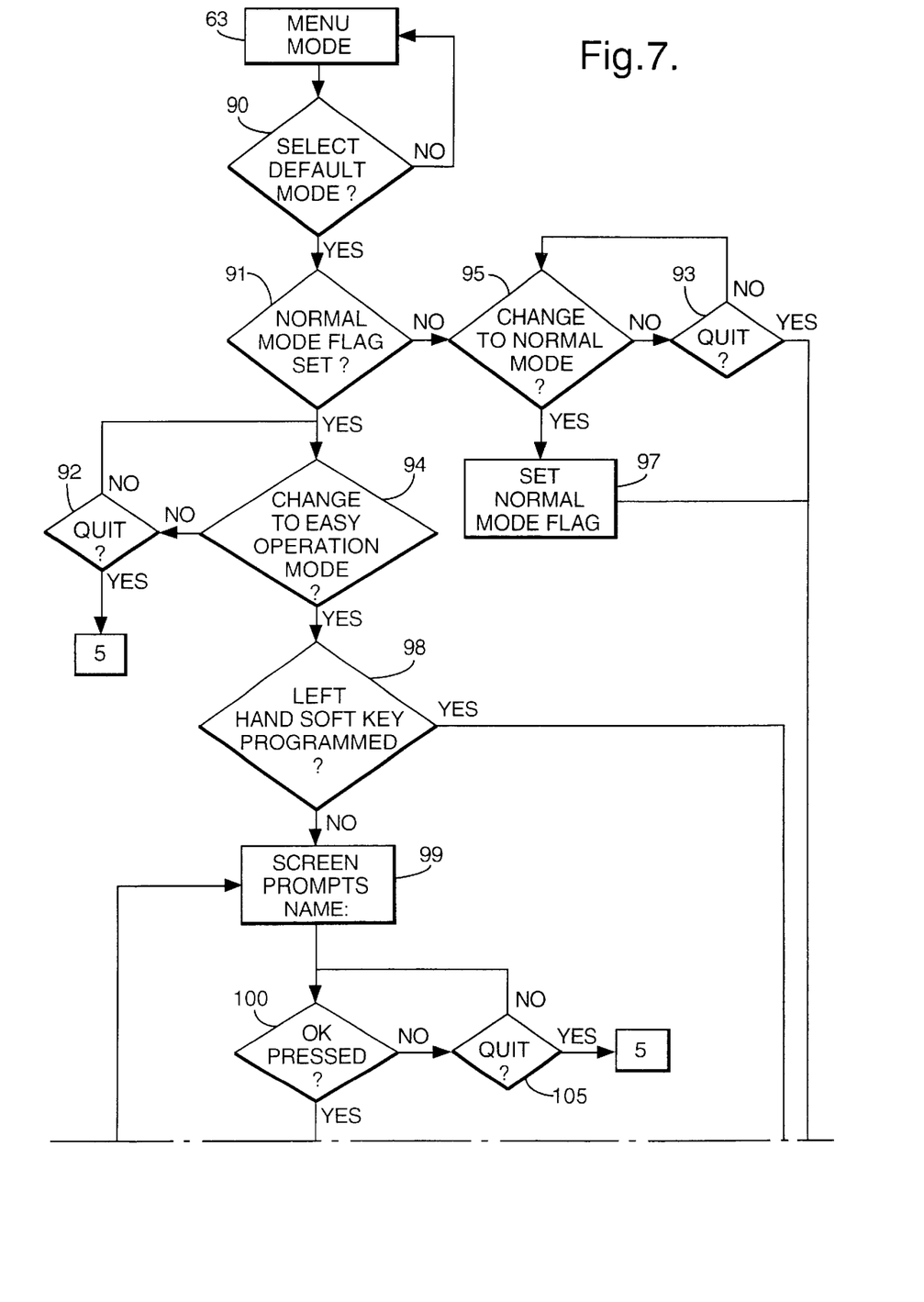
FIG. 7 is a flow chart illustrating operation of the radio telephone of FIGS. 1 and 2.

The user can enter the EASY OPERATION mode from the menu. If the EASY OPERATION mode is selected when the soft keys have not been programmed, the user is prompted to programme the soft keys with speed-dial numbers (FIG. 7). The telephone numbers associated with the respective soft keys can also be programmed via the menu.

Figure 4:
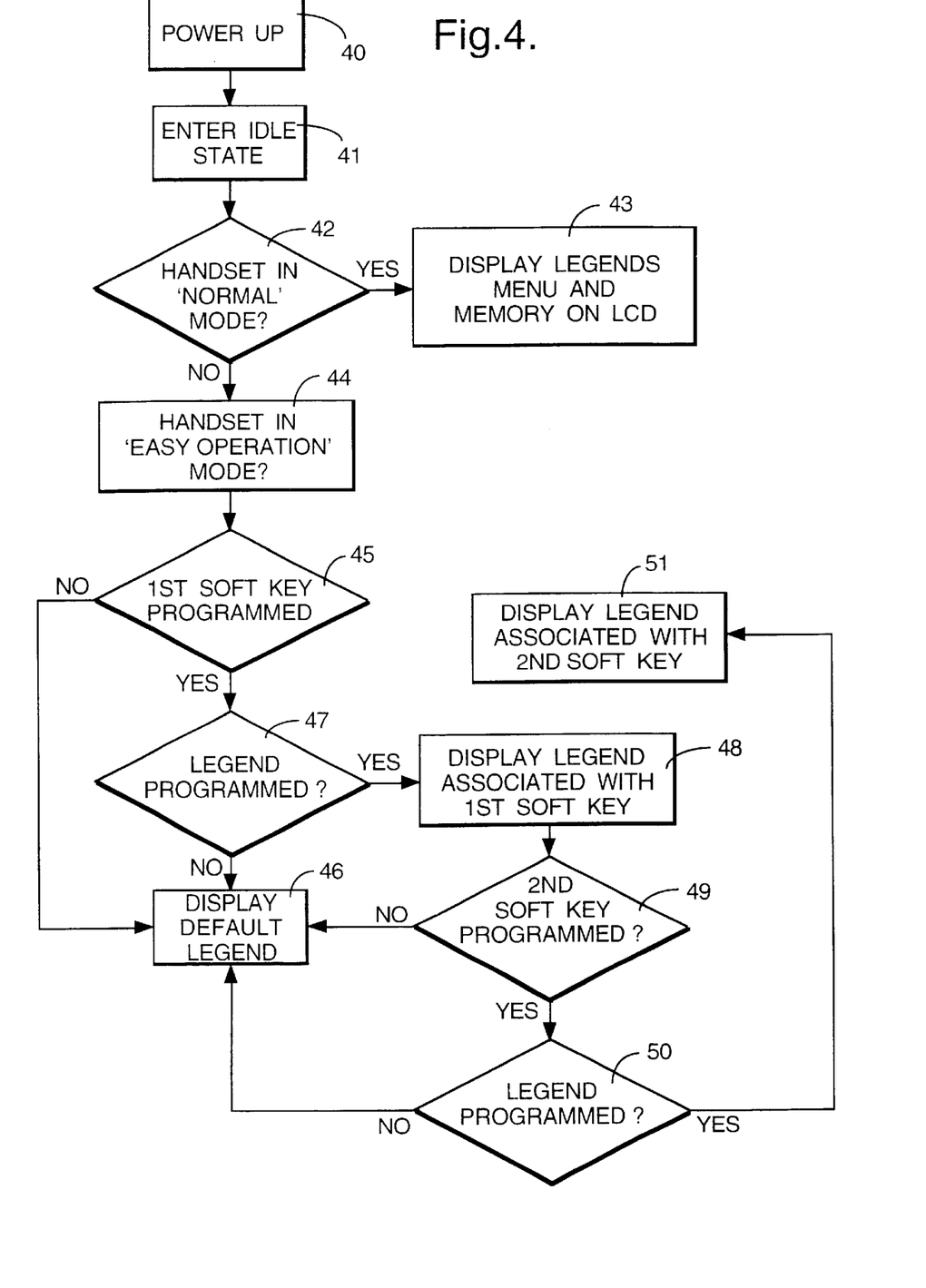
FIG. 4 is a flow chart illustrating operation of the radio handset of FIGS. 1 and 2.

FIG. 4 is a flow chart illustrating operation of the radio telephone on powering up and entering the idle state. When the handset powers up 40, it enters an idle state immediately 41. The microprocessor checks to see if the handset is operating in NORMAL mode 42. If it is, the legends associated with the soft keys in the NORMAL mode are displayed 43 on the LCD 5 in the first and second regions 28,29. In the present example these legends are MENU and MEMORY respectively.

If it is determined that the handset is not in the NORMAL mode 42, as there are only two modes of operation in this embodiment, the handset is determined to be in the EASY OPERATION mode 44. The microprocessor 4 then checks to see if the 1st soft key has been programmed 45. If not a default legend is displayed on the LCD 46 and no function is performed on depression of the 1st soft key. If the 1st soft key has been programmed to hold a speed-dial number, the microprocessor checks if the legend has been programmed 47. If it has, the associated legend is displayed in the first region of the LCD display 48. If not, the default legend will be displayed 46. Depression of the 1st soft key, if suitably programmed, will in any case result in the number being called directly. If the legend has also been entered It will be clear to the user which telephone number the 1st soft key will dial if pressed. The default legend may be a standard character string indicating that no name is associated with the speed-dial number, or more practically, the previous legend used to identify the number to be dialled by depressing the 1st soft key. If the first or second soft key has not been programmed if in the easy operation mode the user will be prompted to enter a telephone number and legend when the respective soft key is pressed. This telephone number will be stored and recalled for the easy operation mode.

The same process occurs for the 2nd soft key. The microprocessor checks to see if the second soft key is programmed 49. If it is, it also checks to see if the legend is programmed 50 and if it is displays the legend associated with the 2nd soft key 51. If not, the default legend is displayed instead 46. In this way the LCD 5 is configured appropriately for the selected default mode in the idle state of the radio telephone when powered up.

Figure 5:
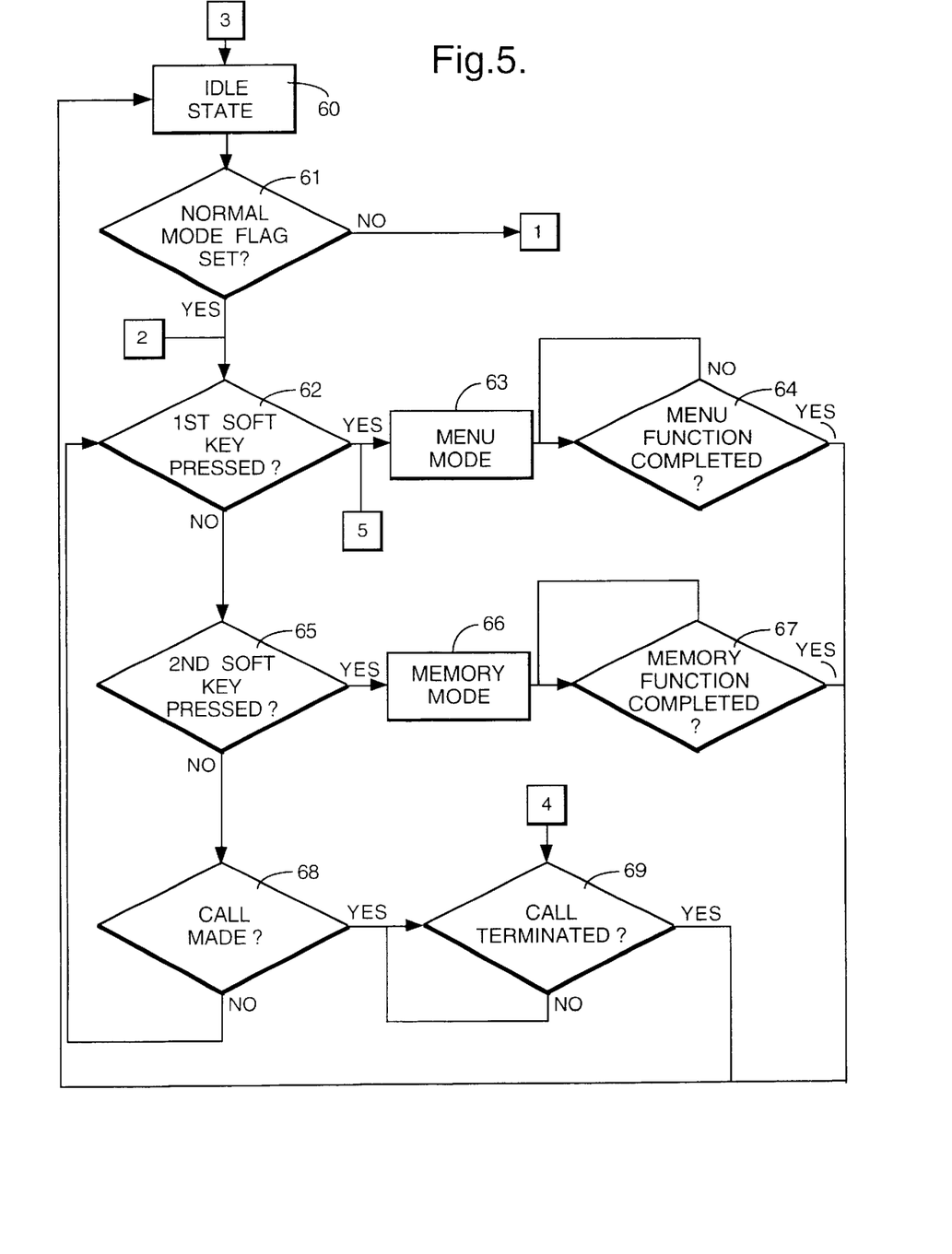
FIG. 5 is a flow chart Illustrating operation of the radio handset of FIGS. 1 and 2.
Figure 6:
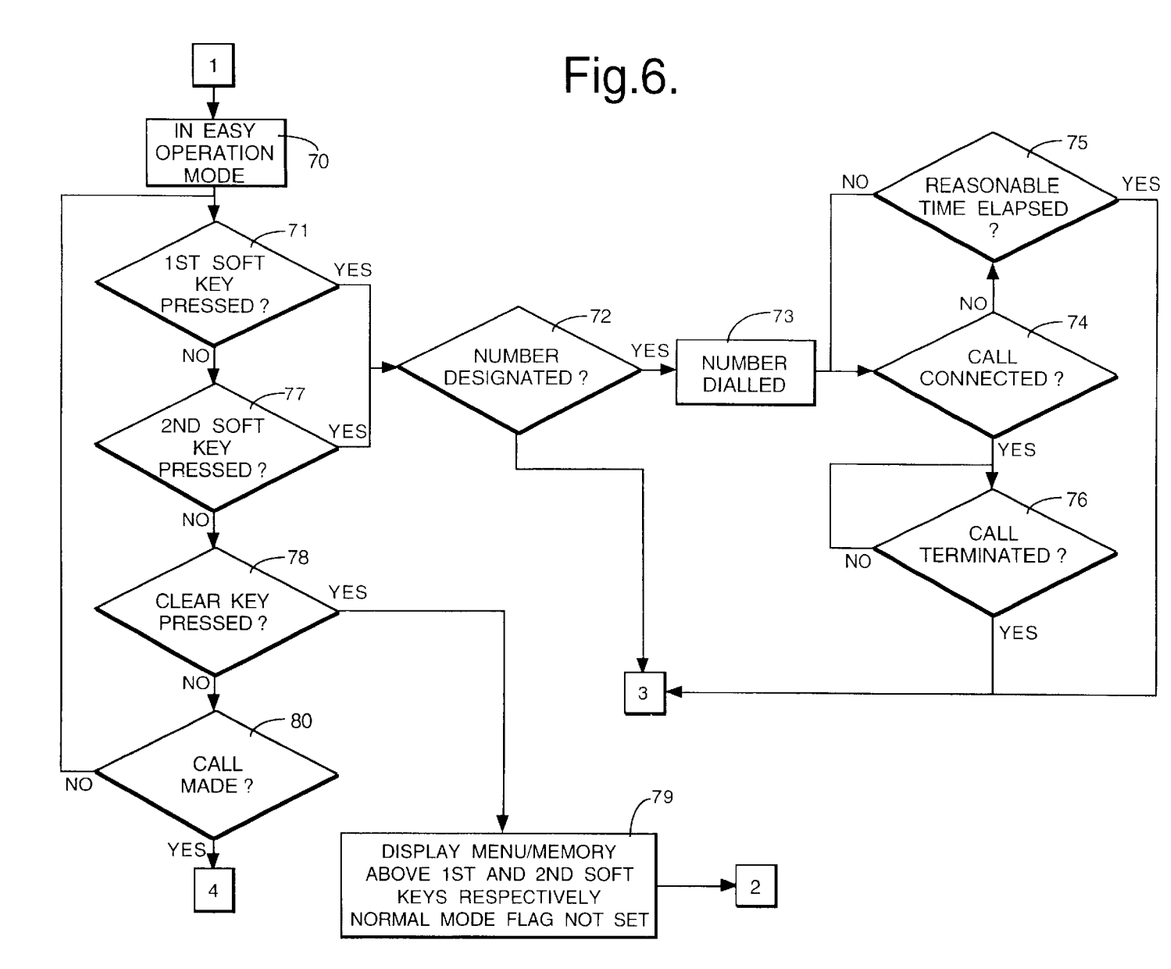
FIG. 6 is a flow chart illustrating operation of the radio handset of FIGS. 1 and 2.

FIGS. 5, 6 and 7 illustrate operation of the radio telephone in the respective modes. Beginning with FIG. 5, when the radio telephone is in the idle state 60, the display will reflect the mode of operation. If the selected default mode is NORMAL, the legend above the first soft key in this example will be MENU and the legend above the second soft key will be MEMORY. If the current default mode is determined to be NORMAL 61, if the 1st soft key is pressed 62, the handset will enter a menu mode 63. In this mode, as discussed briefly above, the user is able to scroll through the available functions and change the operation state of the phone. One of the functions the user can perform in the memory mode is to change the mode of operation in the idle state. The user can scroll through the available options until a selection of NORMAL or EASY OPERATION is found. By scrolling between the options and pressing the soft key with the legend 'select' when the appropriate mode is highlighted, the user can change the idle operating mode if desired. When the user has completed any desired menu functions 64, the handset returns to the idle stats 60. The processor then determines whether the handset is still in NORMAL mode 64 and the process continues.

FIG. 7 shows the process of changing the mode of operation in the idle state in more detail. One of the menu mode operations that can be performed is changing the operating state of the radio telephone in idle. When the menu mode is entered 63 the processor determines if the mode of operation in idle state function has been selected 90. If it has the NORMAL mode flag is checked once more 91. The user is then able to toggle between selection of the NORMAL and EASY OPERATION modes by pressing the scroll key. A desired mode of operation will be selectable by depressing the soft keys that will be appropriately labelled 'select'. The prevailing mode will remain selected if the soft key with a legend 'Quit' is actuated 92;93. If the selection involves a change of mode of operation 94;95 i.e. the user decides to change to the EASY OPERATION mode from the NORMAL mode, the NORMAL mode flag will be reset 96. If this does not involve a change of mode of operation i.e. the user decides to stay in the NORMAL mode, the flag will not be reset. In either case the radio telephone will remain in the menu mode until any operations are completed 64 (FIG. 5) at which point it returns to the idle state 60.

If the normal flag is not set at block 91 i.e. the handset is in the EASY OPERATION mode, the same process takes place. The microprocessor determines if the user has selected a new mode of operation 95. If it has, the NORMAL mode flag is set 97. If not, the handset will remain in the menu mode until the any menu functions are completed 64 (FIG. 5) and the handset returns to the idle state 60.

If the EASY OPERATION mode is selected 94 and there are no associated telephone numbers 98, on selecting the EASY OPERATION mode the user is prompted in turn to enter a label for the left soft key 99, 100 and an associated telephone number 101, 102 and then a label and associated phone number for the right hand soft key 99, 100, 101, 102.

For programming each soft key in turn the screen prompts NAME: 99 and the left and right soft keys have the respective legends OK and quit. The user enters the name he or she wishes to appear above the soft key and presses OK 104 when correct. The screen then prompts NUMBER: 101 and the user enters the telephone number to be called and again presses OK 102 when it is correct. If the user selects 'quit' 92, 93, 104, 105 at any stage no changes are made to the EASY OPERATION mode settings.

If the user wishes to change the names and numbers associated with the soft keys in the EASY OPERATION mode, the function 'EASY OPERATION mode settings' is selected from the menu. The screen prompts NAME: and NUMBER: in turn as before but the name and number currently associated with the respective soft keys in the EASY OPERATION mode are displayed in turn so that if the OK button is pressed with no changes being made, nothing has been altered. The user is, however, able to change the name and number displayed and press OK for the new data to be stored and recalled in the EASY OPERATION mode.

To change from EASY OPERATION mode to NORMAL mode the user presses the clear key. This reverts the legends above the soft keys to 'menu' and 'memory' respectively with the associated functions and allows the user to change mode by entering the menu to select the 'default mode' menu and toggle between the EASY OPERATION and NORMAL modes to indicate NORMAL and press the soft key under the legend 'select' to change the default mode of operation to NORMAL.

Returning to FIG. 5, if the handset remains in NORMAL mode and the 1st soft key 14 is not pressed 62, the processor determines if the 2nd soft key 15 is pressed 65. If it is, the handset enters a MEMORY mode 66 and the user is able to perform memory functions. Once these have been completed 67, the handset returns to the idle state 61 and the processor determines the mode of operation 61. In this instance the handset will remain in NORMAL mode as the idle state mode cannot be changed in the memory mode. In the memory mode numbers can be stored and/or amended in the memory locations available.

If neither the 1st nor 2nd soft key are actuated, the processor checks to see if a call is being made 68. If not, the process continues to poll the 1st and 2nd keys and the other keys of the key pad until the handset is again in use. If the processor determines that a call has been made 68, the call is monitored until the call has terminated 69. When the call has terminated 69 the handset reverts to the idle state 60 and the process continues.

Operation in EASY OPERATION mode will now be described with reference to FIG. 6. If the handset is not in NORMAL mode 61 (FIG. 5), it is determined to be in EASY OPERATION mode 70 as in this particular embodiment there are only two possible modes of operation in the idle state. In the EASY OPERATION mode 70 if the 1st soft key 14 is pressed 71, the processor 4 checks to see if there is a telephone number associated with the soft key 72. If there is, the number is dialled 73. The processor 4 checks to determine if the call has been connected 74. If not, after a reasonable period of time has elapsed 75, for example 30 seconds, the radio telephone reverts to the idle state 60. If the call is connected 74, the microprocessor 4 monitors the call to determine if it has terminated 76. When it has terminated, the radio telephone again reverts to the idle state 60.

The same steps are taken if instead of the 1st soft key being pressed 7 it is the 2nd soft key that is pressed 77. The difference being that another designated number will be dialled 73 instead. If neither of the soft keys are pressed the processors checks if the clear key 16 has been actuated 78. The clear key 16 in this embodiment is used to temporarily change the operation mode when in the idle state from the EASY OPERATION mode to the NORMAL mode of operation. Alternatively this can be viewed as temporarily changing the functions associated with the soft keys in EASY OPERATION mode to mimic those associated with them in the NORMAL mode.

When the NORMAL mode of operation has been entered temporarily by pressing the clear key 16 the legends associated with the soft keys 14, 15 in the NORMAL mode are displayed 79 in the first and second regions 28, 29 above the respective keys. These legends indicate the functions currently associated with the soft keys. The mode of operation in the idle state is not changed at this point. By actuating the menu or memory keys at this stage, the handset will operate as if in the NORMAL mode, however, when the handset next enters the idle state 61 the handset will still be in the EASY OPERATION mode as the NORMAL mode flag has not been set 61.

If the clear key 16 has not been pressed, the processor determines if a call has been made 80. If not the key pad continues to be polled 71,77,78,80, until an action is taken by the user. If a call is made 80, the processor monitors the call and when it is terminated 69 (FIG. 5) the radio telephone returns to the idle state.

In other embodiments of the invention consecutive actuations of the clear key 16 could be used to cause the handset to toggle between displaying the legends of the EASY OPERATION mode and the NORMAL mode on the LCD with the corresponding changes in the functionality of the soft keys 14,15. In yet other embodiments of the invention the NORMAL mode flag could be set when the clear key 16 is depressed to change the mode of the idle state permanently i.e. until the user chooses to change the mode by entering the menu mode, or perhaps semi permanently, for example, until the next time the handset is powered down.

In the embodiment described, there are only two operational states the handset can adopt in the idle state i.e. NORMAL and EASY OPERATION. In other embodiments of the invention there could be more than two modes available in the idle state. In this case the functionality of the soft keys would depend on which of the more than two modes, is the prevailing or current mode.

The functionality of the soft keys in the idle state is not restricted to MENU, MEMORY or SPEED DIALLING. The soft keys could, in other embodiments of the invention, be programmed to adopt any of the functionalities available to the handset. Suitably these would be functions a particular user uses predominantly and would be programmable by the user to suit particular needs. For example, the user may wish to have the handset operate in a particular fashion when at work and in a different fashion at home.

Figure 8A:
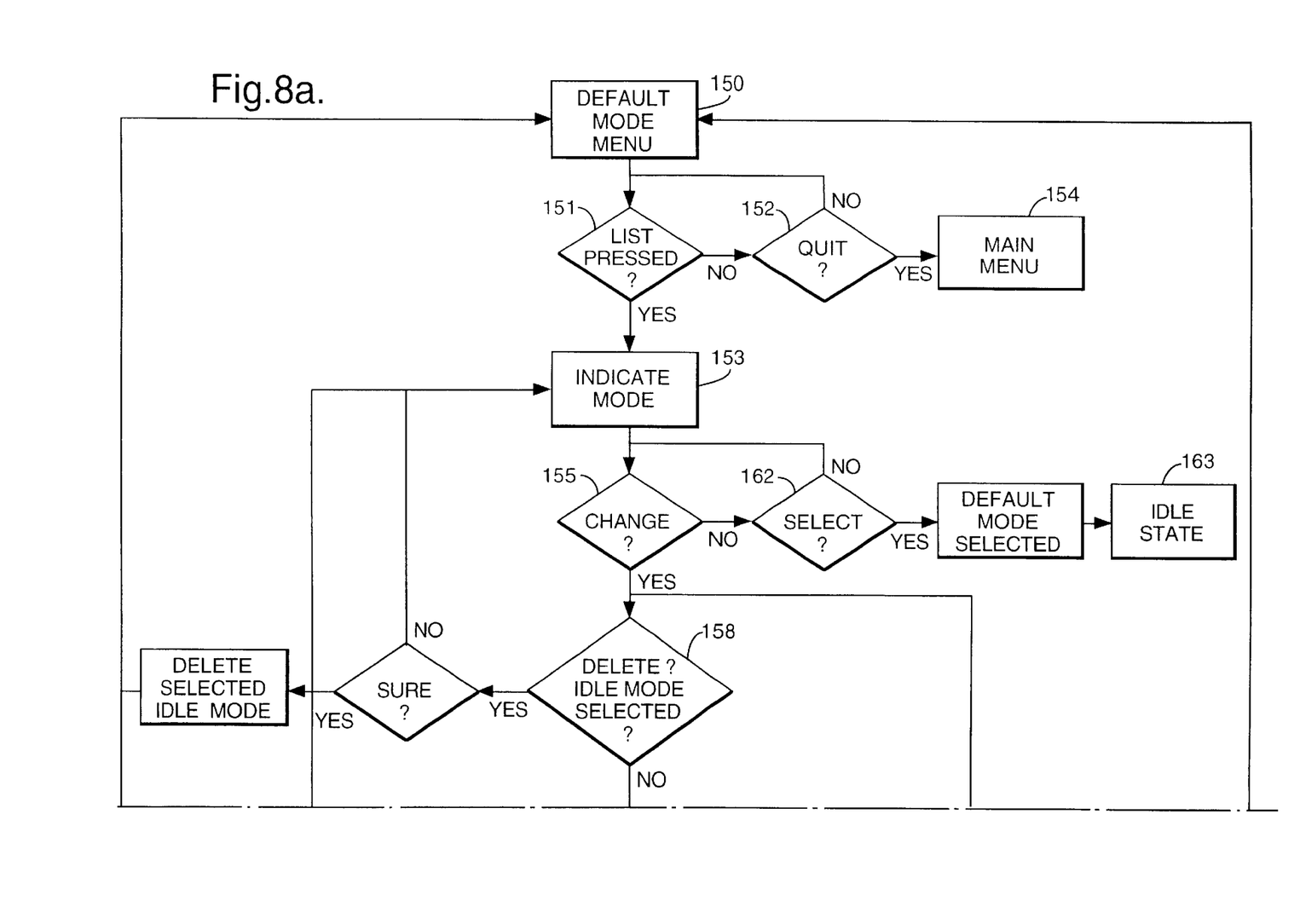
FIGS. 8A and 8B show a flow chart illustrating operation of another embodiment of the invention.
Figure 8B:
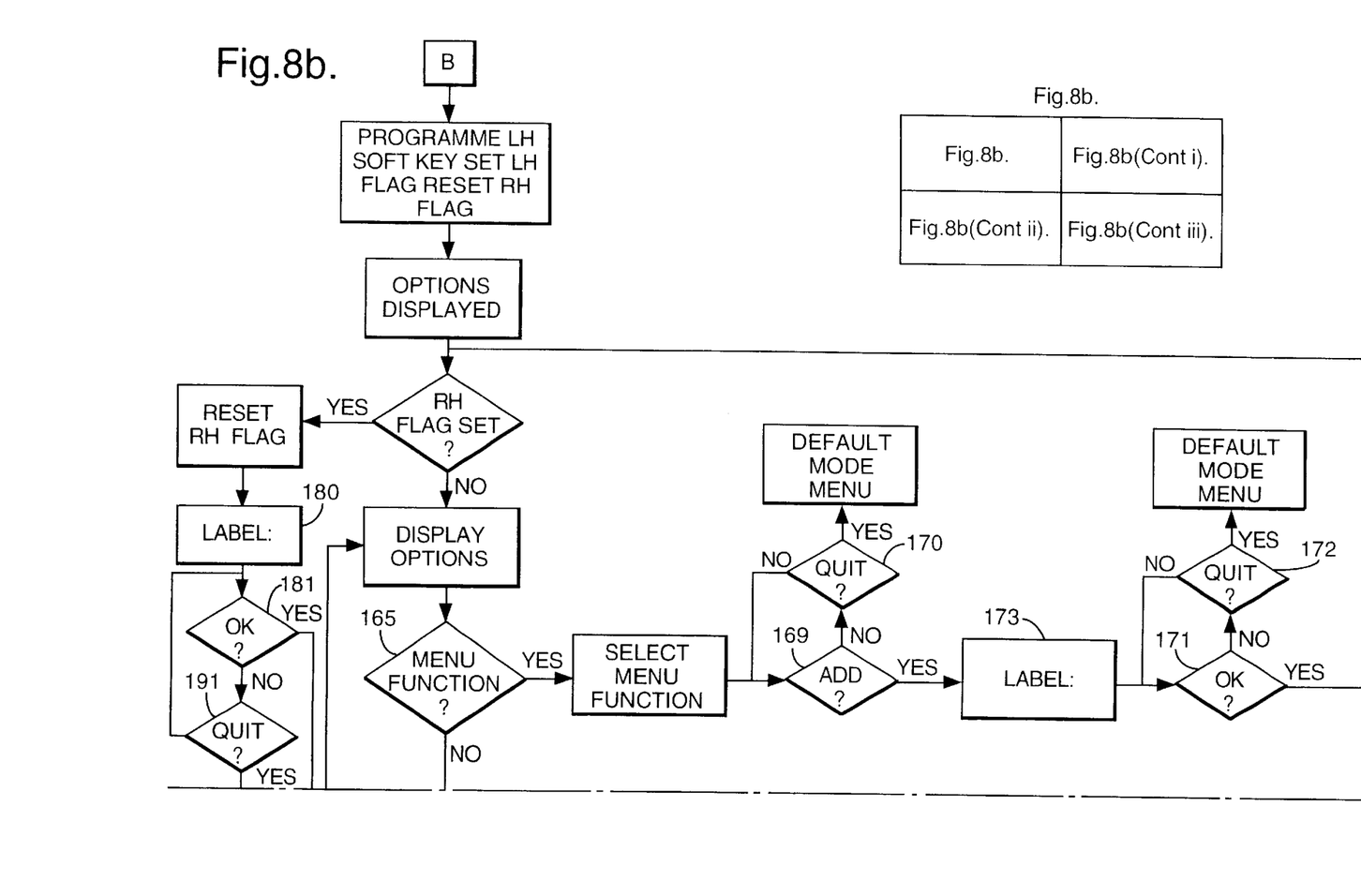

In one embodiment, illustrated in FIGS. 8A and 8B the user is given more freedom in the default mode selection function. Instead of the default modes being preselected, the user is able to define his or her own functions for the soft keys in a range of default modes. The phone may have an EASY OPERATION MODE and a NORMAL mode predefined but be able to add to the list of available default modes and specify the function of the soft keys in each new mode added.

In this example, the user selects the 'default mode' menu 150 and the legends 'list' 157 and 'quit' 152 respectively above the left and right hand soft keys. If the 'list' option is selected the list menu is shown in which available modes are displayed with the options 'select' and 'change' assigned to the respective soft keys. To select a mode from those available, the user scrolls through the list to indicate the desired default mode 153. When the select soft key is pressed 162 the phone reverts to the main menu 154 and enters the selected default mode as it is once more in the idle state 163.

To add a new default mode or delete or modify an existing default mode, the user presses the soft key with the legend 'change' 155 when the list menu is displayed on the screen. The screen then displays a range of options and the legends 'select' and 'quit' appear above the respective soft keys. Pressing 'quit' 156 will return the user to the list of default modes without making any change to the default mode selected. Available options include ADD 157; DELETE 158; EDIT 159; MOVE to TOP 160; and MOVE to BOTTOM 161. The options to delete and move relate to the currently indicated default mode on the list screen.

To add a default mode, the user presses the ADD soft key 157. Another menu showing a range of options including 'menu function' 165; 'memory' 166; and 'memory location' 167 is displayed and the legends above the soft keys read 'select' and 'quit'. 'Quit' 168 returns the user to the list of available default modes. 'Select' allows the user to select one of the options displayed. In this embodiment there are two programmable soft keys. When a new default mode is being formed, the left hand soft key is assigned first.

If the option 'menu function' is selected, the user has access to all the functions available through the menu. These can be accessed through the menu structure in the same way as they are when the menu is accessed to select a menu function but instead of the legends 'select' and 'quit' respectively, the soft keys have the legends 'add' 169 and 'quit' 170.

By pressing the 'add' key 169 a function is assigned to the left soft key in the new default mode. The display prompts the user with label: 173 and the user is able to add a name which will be displayed above the left soft key in the new default mode. The soft keys have the legends OK 171 and 'quit' 172. Once the OK key is pressed, the available options are again displayed to allow the function of the right soft key to be assigned. The same process is repeated to select a function and label for the right hand key.

The function assigned to either soft key can be a menu function or a memory function. If, instead of a menu function, the user wishes the soft key to have the 'memory function' as in the NORMAL mode of use in the previous embodiment, 'memory' 166 is selected from the list and the soft key with the OK legend pressed. The soft key currently being programmed is automatically assigned the memory function and has the legend 'memory' as in the NORMAL mode of the previous embodiment.

The contents of a particular memory location can also be assigned to a soft key so that the telephone number held at that memory location is dialled when the soft key is pressed in the idle state and the name associated with the number provides the legend above the soft key. To do this the user selects 'memory location' from the list 167 of options by highlighting memory location and pressing OK 174. The screen prompts the user to enter a memory location and/or name. When the memory location or name is entered and the OK soft key pressed, the telephone number or data held at that memory location and the name are assigned to the soft key so that the stored name provides the legend above the soft key in the new default mode and in the new default mode when the soft key with that legend is pressed with that legend the telephone number associated with it is called. In other embodiments, the memory locations could be displayed as a list on the screen by name or by number and selected by indicating one of the list and pressing the OK button.

Once the functions and labels have been assigned to the soft keys for a new default mode, the user is prompted to enter a name for the new default mode 180. The soft keys display OK and quit. If the user enters a label for the new default mode and presses the OK soft key, the screen returns to the list of default modes menu screen. This time the label for the new default mode is included at the bottom of the list. If no name is entered to label the new default mode, when the OK key is pressed, the new default mode will be given a default name or number. This will appear an the default mode list.

In one embodiment, if no function is assigned to a soft key in a particular default mode, no function is performed on depressing that function key in that default mode. In other embodiments, however, other options are envisaged for specifying the function of a key in an default mode if none is assigned. For example a default function of menu for the left hand soft key and memory for the right hand soft key could be provided.

The functions and/or legends associated with one or both of the soft keys in a user defined default mode can be edited by selecting the edit option from the 'change' menu. The functions and legends associated with the left and right soft keys are displayed in turn by pressing the left soft key with the legend OK, the other soft key has the legend 'edit'. When the 'edit' soft key is pressed, the screen displays the options available for the soft keys in the idle state. The screen display will be the same as the option screen displayed when the add an default mode option is selected. New functions can be assigned to the respective soft keys in the some way as they can be selected for a new default mode. If, however, OK is pressed without editing a particular function or label the original function of the soft key is preserved.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A radio communications device operable in at least first and second default modes to which the device returns under predetermined conditions, each of the default modes having different functionality but sharing a common function of initiating radio communication wherein the initiating of radio communication in the second default mode is provided without entering the first default mode, the common function including a dialing of one or more stored telephone numbers wherein the dialing of stored telephone numbers in the second default mode is provided without entering the first default mode, the radio communication device comprising a processor, a transceiver, and a user input device having an associated legend for indicating the prevailing function associated therewith, the processor being operable to respond to actuation of the user input device to perform the respective associated function in the respective default modes and being arranged to control the transceiver to initiate radio communication, and wherein the processor is operable to establish two-way communications with a base station.

2. A radio communications device comprising a radiotelephone and being operable in at least first and second default modes to which the device returns under predetermined conditions, each of the default modes having different functionality but sharing a common function of initiating radio communication wherein the initiating of radio communication in the second default mode is provided without entering the first default mode, the common function including a dialing of one or more stored telephone numbers wherein the dialing of stored telephone numbers in the second default mode is provided without entering the first default mode, the radio communication device comprising a processor, a transceiver, and a user input device having an associated legend for indicating the prevailing function associated therewith, the processor being operable to respond to actuation of the user input device to perform the respective associated function in the respective default modes and being arranged to control the transceiver to initiate radio communication.

3. A radio communications device operable in at least first and second default modes to which the device returns under predetermined conditions, each of the default modes having different functionality but sharing a common function of initiating radio communication wherein the initiating of radio communication in the second default mode is provided without entering the first default mode, the common function including a dialing of one or more stored telephone numbers wherein the dialing of stored telephone numbers in the second default mode is provided without entering the first default mode, the radio communication device comprising a processor, a transceiver, and a user input device having an associated legend for indicating the prevailing function associated therewith, the processor being operable to respond to actuation of the user input device to perform the respective associated function in the respective default modes and being arranged to control the transceiver to initiate radio communication, and wherein each of the default modes is user selectable.

4. A radio communications device operable in at least first and second default modes to which the device returns under predetermined conditions, each of the default modes having different functionality but sharing a common function of initiating radio communication wherein the initiating of radio communication in the second default mode is provided without entering the first default mode, the common function including a dialing of one or more stored telephone numbers wherein the dialing of stored telephone numbers in the second default mode is provided without entering the first default mode, the radio communication device comprising a processor, a transceiver, and a user input device comprising a key and having an associated legend for indicating the prevailing function associated therewith, the processor being operable to respond to actuation of the user input device to perform the respective associated function in the respective default modes and being arranged to control the transceiver to initiate radio communication.

5. A radio communications device operable in at least first and second default modes to which the device returns under predetermined conditions, each of the default modes having different functionality but sharing a common function of initiating radio communication wherein the initiating of radio communication in the second default mode is provided without entering the first default mode, the common function including a dialing of one or more stored telephone numbers wherein the dialing of stored telephone numbers in the second default mode is provided without entering the first default mode, the radio communication device comprising a processor, a transceiver, and a user input device having an associated legend for indicating the prevailing function associated therewith, the processor being operable to respond to actuation of the user input device to perform the respective associated function in the respective default modes and being arranged to control the transceiver to initiate radio communication, and wherein the default modes are programmable.

6. A radio communications device operable in a plurality of default modes to one of which the device returns under predetermined conditions, each of the default modes having different functionality but sharing a common function of initiating radio communication wherein the initiating of radio communication in any one of the default modes is provided without another one of the default modes, the common function including a dialing of one or more stored telephone numbers, the radio communication device comprising a processor, a transceiver, and a user input device having an associated legend for indicating the prevailing function associated therewith, the processor being operable to respond to actuation of the user input device to perform the respective associated function in the respective default modes and being arranged to control the transceiver to initiate radio communication.

* * * * *